United States Patent
Shanmuga Sundaram et al.

(10) Patent No.: US 10,768,992 B2
(45) Date of Patent: Sep. 8, 2020

(54) PROVISIONING A NEW NETWORK DEVICE IN A STACK

(71) Applicant: Hewlett Packard Enterprise Development LP, Houston, TX (US)

(72) Inventors: Dhanesh Kumar Shanmuga Sundaram, Bangalore Karnataka (IN); Supreeth Sathyanarayana, Bangalore Karnataka (IN); Praveen Ramesh Ganjam, Bangalore Karnataka (IN); Yashavantha Nagaraju, Bangalore Karnataka (IN)

(73) Assignee: Hewlett Packard Enterprise Development LP, Houston, TX (US)

( * ) Notice: Subject to any disclaimer, the term of this patent is extended or adjusted under 35 U.S.C. 154(b) by 254 days.

(21) Appl. No.: 15/865,972

(22) Filed: Jan. 9, 2018

(65) Prior Publication Data

US 2019/0213047 A1    Jul. 11, 2019

(51) Int. Cl.
*H04L 12/24* (2006.01)
*G06F 9/50* (2006.01)

(52) U.S. Cl.
CPC .......... *G06F 9/5055* (2013.01); *G06F 9/5077* (2013.01); *H04L 41/0806* (2013.01); *H04L 41/0846* (2013.01); *H04L 41/0853* (2013.01); *H04L 41/0893* (2013.01); *H04L 41/12* (2013.01)

(58) Field of Classification Search
CPC .... G06F 9/5055; G06F 9/5077; G06F 9/5094; H04L 41/0806; H04L 41/0846; H04L 41/0853; H04L 41/0893; H04L 41/12; H04L 41/0809; H04L 41/142; H04L 41/14; H04L 63/083; H04B 3/542; H04W 24/02;
(Continued)

(56) References Cited

U.S. PATENT DOCUMENTS 7,469,279 B1    12/2008 Stamler et al.
9,124,495 B2    9/2015 Jagannathan et al.
(Continued)

OTHER PUBLICATIONS

Automatic Switch Configuration When Replaced with a Faulty Switch in a Stack, (Web Page), Retrieved Nov. 15, 2017, 4 Pgs.
(Continued)

*Primary Examiner* — Le H Luu
(74) *Attorney, Agent, or Firm* — Hewlett Packard Enterprise Patent Department

(57) ABSTRACT

Examples disclosed herein relate to provisioning a network device in a stack. In an example, a master network device in a stack may detect a new network device in the stack. In response to detecting, master network device may determine whether a member network device of the stack is missing. In response to determining that the member network device of the stack is missing, master network device may identify each active adjacent member of the member network device. The master network device may determine whether each active adjacent member of the member network device has detected the new network device in the stack. In response to determining that each active adjacent member of the member network device has detected the new network device in the stack, master network device may provision the new network device with a member ID of the member network device to the stack.

20 Claims, 5 Drawing Sheets

(58) Field of Classification Search
CPC ............... H04W 4/029; H04W 40/244; H04W 72/0453; H04W 8/186
See application file for complete search history.

(56) References Cited

U.S. PATENT DOCUMENTS

| | | | |
|---|---|---|---|
| 9,294,350 B2 | 3/2016 | Agarwal et al. | |
| 9,503,322 B2 | 11/2016 | Gopalarathnam | |
| 9,559,897 B2 | 1/2017 | Lin et al. | |
| 2013/0159862 A1* | 6/2013 | Carr | H04W 4/029 715/734 |
| 2015/0256401 A1* | 9/2015 | Zinger | H04L 41/14 370/401 |
| 2015/0372717 A1* | 12/2015 | Schrum, Jr. | H04B 3/542 370/458 |
| 2016/0112436 A1* | 4/2016 | Kopp | H04L 41/0809 726/1 |
| 2016/0191357 A1* | 6/2016 | Orner | H04W 24/02 370/328 |
| 2017/0339178 A1* | 11/2017 | Mahaffey | H04L 41/142 |
| 2018/0234970 A1* | 8/2018 | Hall | H04W 72/0453 |
| 2018/0255042 A1* | 9/2018 | Ashiya | H04L 63/083 |
| 2019/0028886 A1* | 1/2019 | Deixler | H04W 8/186 |
| 2019/0114212 A1* | 4/2019 | Gwin | G06F 9/5083 |
| 2019/0191357 A1* | 6/2019 | Slav | H04W 40/32 |

OTHER PUBLICATIONS

Catalyst 2960-X Switch Stack Manager Configuration Guide, Cisco IOS Release 15.0(2)EX, (Web Page), Retrieved Nov. 15, 2017, 32 Pgs.

\* cited by examiner

PROVISIONING A NEW NETWORK DEVICE IN A STACK

BACKGROUND

Computer networks form the foundation of an organization's information technology (IT) infrastructure. Considering their importance, computer networks are expected to have high availability and scalability. A stacking system (or stack) may be useful in this regard. In a stacking system, two or more network devices (for example, network switches) may be connected to one another via cables, to form a single logical network device.

BRIEF DESCRIPTION OF THE DRAWINGS

For a better understanding of the solution, examples will now be described, with reference to the accompanying drawings, in which.

DETAILED DESCRIPTION

A stacking system or architecture may include one or more network devices (for example, network switches) that may be connected to one another via one or more cables, to form a single logical network device. Configuration and routing information may be shared by every network device in the stacking system so that multiple network devices appear as a single network unit to an external component. All stack members may have complete access to the stacking, backplane (for example, connections between stacked units, and interconnect bandwidth). Network topology and routing information may be regularly updated among the stack network devices.

In a stacking system, one member network device may be designated as the main device of the stack. Such network device may be called a master network device or a commander device. A master network device may act as the control center for a stack.

Each network device is assigned a member ID upon joining a stack. When a member needs to be replaced, for example, due to a fault, a user has to manually unprovision the member from the stack, for the stack to detect the replacement prior to replacing the actual hardware. The user may then provision the new member with a member ID of the unprovisioned device, and then initiate the hardware replacement with stack port connection details. This process is expected to occur in the aforementioned sequence if the hardware replacement happens prior to the unprovisioning step, the new device may be treated as a new member (instead of a replacement) and may be allocated a new member ID. This may result in loss of member related configurations.

To address these technical challenges, examples are described for provisioning a network device in a stack. In an example, a master network device in a stack may detect a new network device in the stack. In response to detecting, the master network device may determine whether a member network device of the stack is missing. In response to determining that the member network device of the stack is missing, the master network device may identify each active adjacent member of the member network device. The master network device may determine whether each active adjacent member of the member network device has detected the new network device in the stack. In response to determining that each active adjacent member of the member network device has detected the new network device in the stack, the master network device may provision the new network device with a member ID of the member network device to the stack.

The proposed solution may enable a stack to automatically detect and provision a new member depending on whether the new member is being included as a replacement for an earlier member or getting added as a new member.

Figure 1:
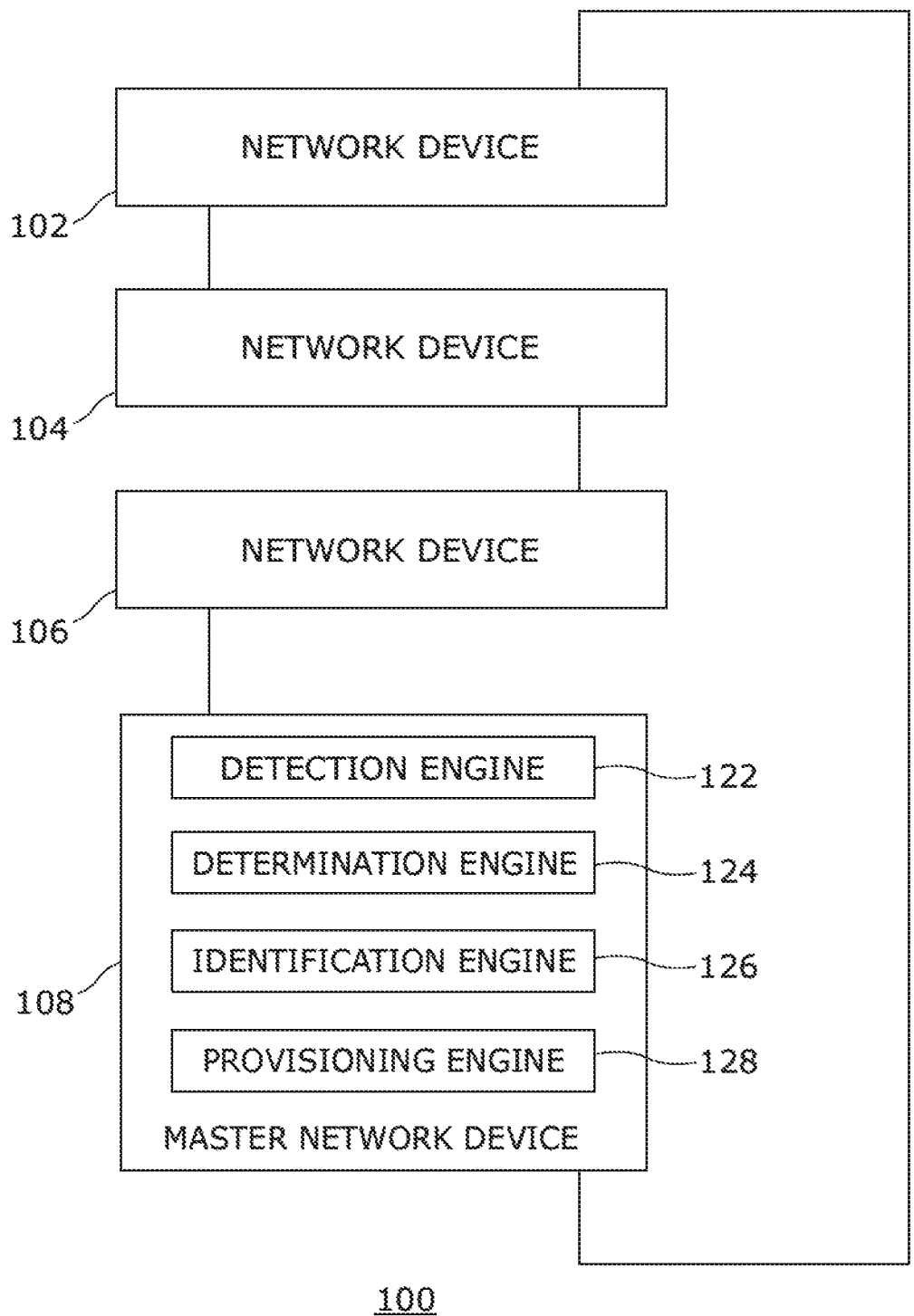
FIG. 1 is a block diagram of an example stack used for provisioning a network device.

FIG. 1 is a diagram of an example stacking system (or stack) 100 for provisioning a network device.

In an example, stack 100 may comprise a plurality of network devices. Referring to FIG. 1, stack 100 may include a plurality of network devices 102, 104, 106, and 108. Although four network devices are shown in FIG. 1, other examples of this disclosure may include a stack with more or less than four network devices.

Network devices 102, 104, 106, and 108 may be communicatively coupled to one another via one or more cables. Network devices 102, 104, 106, and 108 may be arranged in stack 100 through various types of network topologies, for example, a Ring topology, a chain topology, and a mesh topology.

Network devices 102, 104, 106, and 108 may each be, for example, a network switch, or any other network device that is capable of performing switching-related functions. Network devices 102, 104, 106, and 108 may be communicatively coupled to one another to form a single logical network device. Each of the network devices 102, 104, 106, and 108 in stack 100 may share configuration and routing information so that network devices 102, 104, 106, and 108 may appear as a single network unit to an external device. In an instance, all stack members (i.e. 102, 104, 106, and 108) in stack 100 may have complete access to the stacking backplane (for example, connections between stacked units, and interconnect bandwidth). Network topology and routing information may be regularly updated among the stacked network devices. Thus, from the perspective of a management plane and a data plane, the stacked devices may operate as a single virtual device.

Stack 100 may separate the control plane from the data plane. In an instance, one member network device may be designated as the main device of stack 100. Such network device may be called a master network device or a commander device. Referring to FIG. 1, in an example, network device 108 may act as master network device. Master network device may act as, the control center for stack 100. For example, master network device may manage the configuration information. The remaining network devices in stack 100 may be referred to as member devices. A member device may manage the data plane of stack 100. Each network device in stack 100 may have the capability to act as master network device. All member network devices of stack 100 may share same Layer 2 and Layer 3 addresses.

Each member network device in a stack 100 may be identified via a member ID, for example, a member number (for example, 1, 2, 3, 4, and so on). A member ID may be used to determine the interface-level configuration that a member network device may use. Member network devices in the same stack cannot share the same member ID.

In an example, master network device 108 may include a detection engine 122, a determination engine 124, an identification engine 126, and a provisioning engine 128.

Engines 122, 124, 126, and 128 may include any combination of hardware and programming to implement the functionalities of the engines described herein, in examples described herein, such combinations of hardware and programming may be implemented in a number of different ways. For example, the programming for the engines may be processor executable instructions stored on at least one non-transitory machine-readable storage medium and the hardware for the engines may include at least one processing resource to execute those instructions. In some examples, the hardware may also include other electronic circuitry to at least partially implement at least one engine of master network device 108. In some examples, the at least one machine-readable storage medium may store instructions that, when executed by the at least one processing resource, at least partially implement some or all engines of master network device 108. In such examples, master network device 108 may include the at least one machine-readable storage medium storing the instructions and the at least one processing resource to execute the instructions.

In an example, it may be desirable to replace a member network device of stack, for example, due to a fault or performance-related issue with the member network device. In such case the member network device (hardware) may be removed from stack 100. A new network device (hardware) may be added to stack 100. In an example, the new network device (hardware) is included at the location left vacant by the removal of the earlier member network device. For example, the new network device (hardware) may be mounted at a slot left vacant by the removal of the earlier member network device from a rack that houses the member network devices of stack 100.

Upon inclusion of the new network device (hardware) to stack 100, detection engine 122 on master network device in stack 100 may detect the new network device. When the new network device (hardware) is added, the stack ports in an adjacent switch may come up. This may provide an indication to detection engine 122 that a new network device (hardware) has been added to stack 100. Further, upon joining stack 100, the new network device may initially think that it is currently the master network device in stack 100 and share device-specific information with the current master network device 108. The information may include) for example, a MAC address and a device type (for example, a 24-port device, a 48-port device, a Power over Ethernet (PoE) device, a non-PoE device, etc.) of the new network device. Upon receiving the information, detection engine 122 on master network device may compare the information against a database to determine whether the information preexists. In response to a determination that the information does not preexist in the database, detection engine 122 may identify the new network device as a new addition to stack 100.

In response to the detection of the new network device in stack 100 by detection engine 122, determination engine 124 may determine whether a member network device of stack 100 is missing. In an example, determination engine 124 may make the determination by sending a heartbeat message (s) to each member network device, including the missing member network device, of stack 100. In case determination, engine 124 does not receive a response to the heartbeat message from a member network device, determination engine 124 may assume the member network device as missing. As used herein, a heartbeat message may include a message sent from an originator to a destination that enables the destination to identify whether the originator has failed or is no longer available.

In response to the determination that a member network device of stack 100 is missing, identification engine 126 may identify each active adjacent member of the missing member network device. As used herein, an "active adjacent member" of a member network device in stack 100 may include a network device that is directly connected to a stack port of the member network device. In an example, each member network device of stack 100 may send information related to each of its active adjacent members to the master network device. The information may include, for example, a device type (for example, a 24-port device, a 48-port device, a Power over Ethernet (PoE) device, a non-PoE device, etc.) of an active adjacent member of a member network device, a MAC address of the active adjacent member, and a port identifier of a port on the active adjacent member where the member network device is connected. The master network device may maintain a record of member network devices along with the information related to their adjacent members, for example, in a database.

In response to the identification of each active adjacent member of the missing member network device, determination engine 124 may determine whether each active adjacent member of the missing member network device has detected the new network device in stack 100. As mentioned earlier, each member network device of stack 100 may send information related to each of its active adjacent members to the master network device. This is true in case of each active adjacent member of the missing member network device as well. Each active adjacent member of the missing member network device may share information related to the new network device with the master network device. The information may include, for example, a device type (for example, a 24-port device, a 48-port device, a Power over Ethernet (PoE) device, a non-PoE device, etc.) of the new network device, a MAC address of the new network device, and a port identifier of a port on the active adjacent member where the new network device is connected. The information may be stored, for example, in a database on the master network device. Based on the information received by the master network device, determination engine 124 may determine whether each active adjacent member has detected the new network device. In an example, the determination may include determining whether each active adjacent member has detected the new network device on a respective stack port where the missing member network device was previously connected. In an example, the determination may include determining whether each active adjacent member has detected same information related to the new network device. The information may include, for example, a device type of the new network device and a MAC address of the new network device.

In response to the determination that each active adjacent member of the member network device has detected the new network device in stack 100, provisioning engine 128 may provision the new network device with a member ID of the missing member network device to stack 100. As mentioned earlier, each member network device in stack 100 may be identified via a member ID, for example, a member number (for example, 1, 2, 3, 4, and so on). In the present context, the new network device may be provisioned with the member ID of the missing member network device. In an example, the provisioning may include applying, by provisioning engine 128, a configuration setting(s) of the missing member network device to the new network device. The configuration setting may be present in a configuration file(s). The configuration setting may include, for example, a setting related to Internet Protocol (IP), virtual Local Area Network (VLAN), and Simple Network Management Protocol (SNMP).

Figure 2:
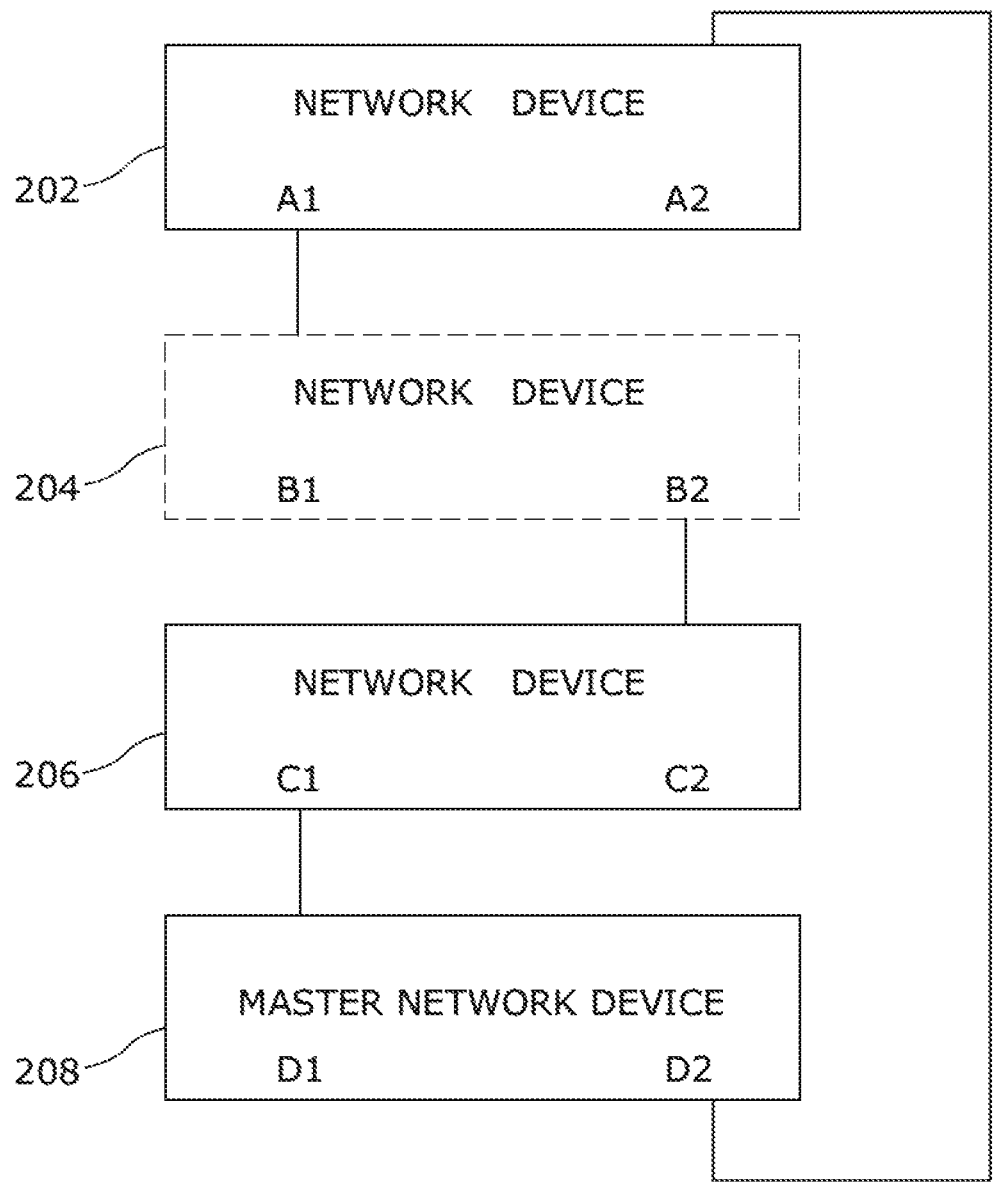
FIG. 2 is a block diagram of an example stack illustrating provisioning of a network device.

FIG. 2 is a block diagram of an example stack 200 illustrating provisioning of a network device. In an example, stack 200 may comprise a plurality of network devices 202, 204, 206, and 208. Network devices 202, 204, 206, and 208 may be communicatively coupled to one another via one or more cables. In an example, network device 208 may act as a master network device.

In an example, network device 204 (illustrated via a dotted line in FIG. 2) may be removed from stack, for example, due to a fault. Network device 204 may be referred to as a missing member network device. In the present example, network devices 202 and 206 may be the active adjacent members of missing member network device 204. Stack ports A1 and C2 on network devices 202 and 206 respectively may go down upon removal of network device 204.

In an example, member network device 204 may be replaced by a new network device on stack ports A1 and C2. Master network device 208 in stack 200 may detect the new network device. In response to detecting, master network device 208 may determine whether a member network device of the stack is missing. In the present example, master network device 208 may detect that network device 204 is missing. In response to determining that member network device 204 is missing, master network device 208 may identify each active adjacent member of member (for example, 202 and 206) of the new network device.

Master network device 208 may determine whether each active adjacent member of the missing member network device 204 has detected the new network device in stack 200. In response to determining that each active adjacent member of the missing member network device 204 has detected the new network device in stack 200, master network device 208 may provision the new network device with a member ID of the missing member network device 204 to stack 200.

Figure 3:
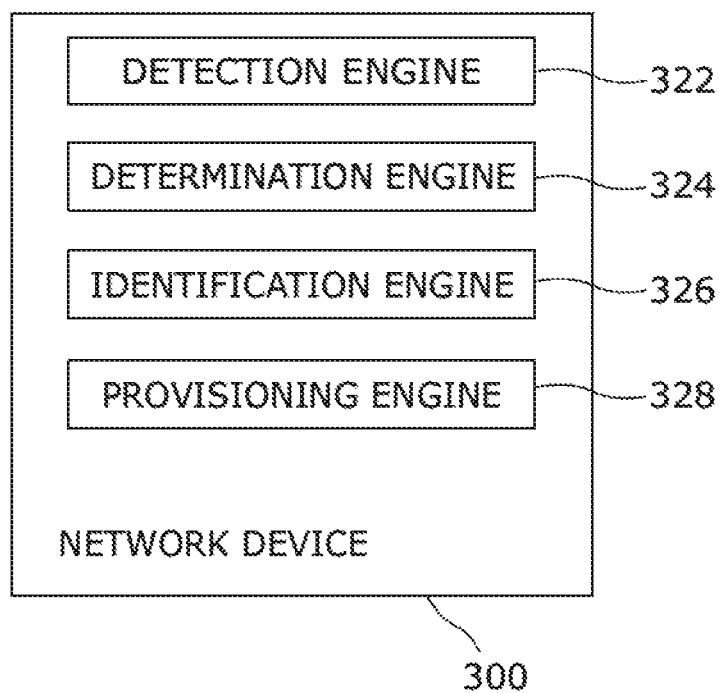
FIG. 3 is a diagram of an example network device used for provisioning another network device in a stack.

FIG. 3 is a block diagram of an example network device 300 for provisioning a new network device in a stack. In an example, network device 300 may be analogous to any of the network devices 102, 104, 106, and 108 of FIG. 1, in which like reference numerals correspond to the same or similar, though perhaps not identical, components. For the sake of brevity, components or reference numerals of FIG. 3 having a same or similarly described function in FIG. 1 are not being described in connection with FIG. 3. Said components or reference numerals may be considered alike.

Network device 300 may include, for example, a network switch or any other network device that is capable of performing switching-related functions. In an example, network device may act as a standby or master network device in a stack.

In an example, network device 300 may include a detection engine 322, a determination engine 324, an identification engine 326, and a provisioning engine 328. In an example, the aforementioned engines may perform functionalities similar to those described earlier in reference to detection engine 122, determination engine 124, identification engine 126, and provisioning engine 128 of FIG. 1, respectively.

In an example, detection engine 322 may detect a new network device in stack. In response to the detection, determination engine 324 may determine whether a member network device of the stack is missing. In response to the determination that the member network device of the stack is missing, identification engine 326 may identify each active adjacent member of the member network device. Determination engine 324 may then determine whether each active adjacent member of the member network device has detected the new network device in the stack. In response to the determination that each active adjacent member of the member network device has detected the new network device in the stack, provisioning engine 328 may provision the new network device with a member ID of the member network device to the stack. Provisioning engine may apply a configuration setting of the member network device to the new network device.

Figure 4:
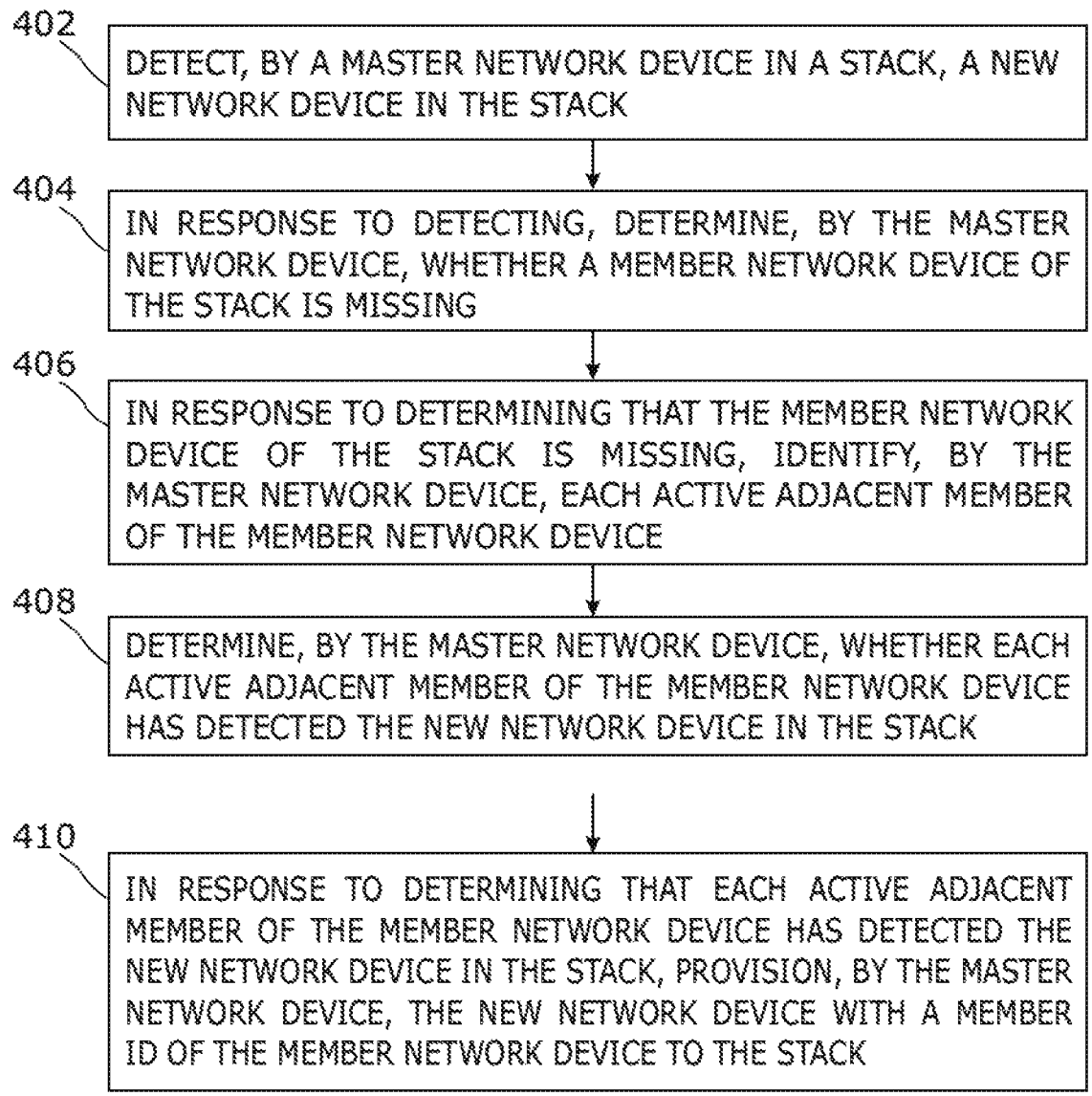
FIG. 4 is a block diagram of an example method of provisioning a network device in a stack.

FIG. 4 is a block diagram of an example method 400 for provisioning a network device in a stack. The method 400, which is described below, may be partially executed on a network device such as network device 102, 104, 106, or 108 of FIG. 1, network device 202, 204, 206, or 208 of FIG. 2, or network device 300 of FIG. 3. However, other suitable network devices may execute method 400 as well. At block 402, a master network device in a stack may detect a new network device in the stack. At block 404, in response to detecting, the master network device may determine whether a member network device of the stack is missing. At block 406, in response to determining that the member network device of the stack is missing, the master network device may identify each active adjacent member of the member network device. At block 408, the master network device may determine whether each active adjacent member of the member network device has detected the new network device in the stack. At block 410, in response to determining that each active adjacent member of the member network device has detected the new network device in the stack, the master network device may provision the new network device with a member ID of the member network device to the stack.

Figure 5:
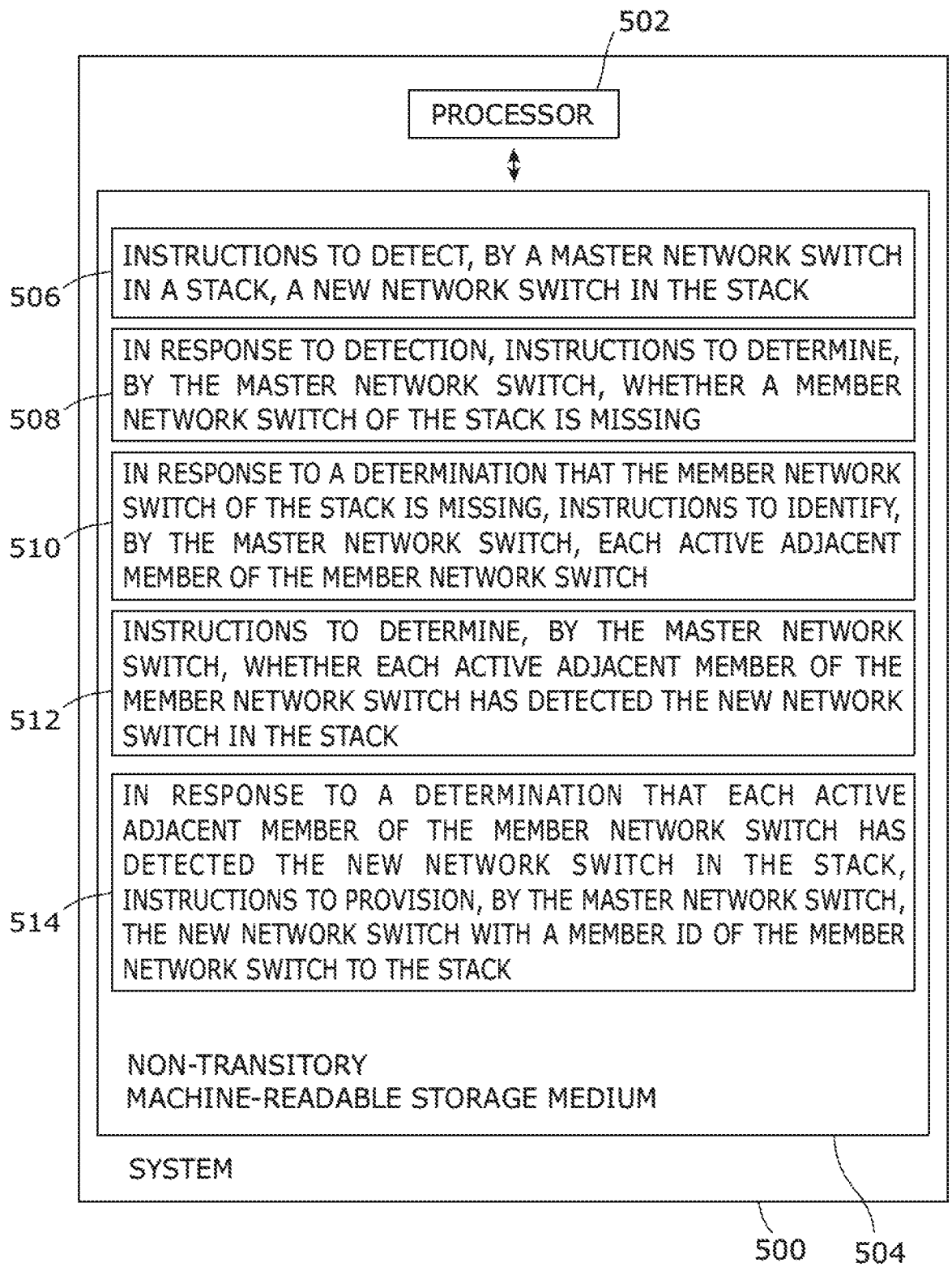
FIG. 5 is a block diagram of an example system including instructions in a machine-readable storage medium for provisioning a network device in a stack.

FIG. 5 is a block diagram of an example system 500 including instructions in a machine-readable storage medium for provisioning a network device in a stack. System 500 includes a processor 502 and a machine-readable storage medium 504 communicatively coupled through a system bus. In an example, system 500 may be analogous to network device 102, 104, 106, or 108 of FIG. 1, network device 202, 204, 206, or 208 of FIG. 2, or network device 300 of FIG. 3. Processor 502 may be any type of Central Processing Unit (CPU), microprocessor, or processing logic that interprets and executes machine-readable instructions stored in machine-readable storage medium 504. Machine-readable storage medium 504 may be a random access memory (RAM) or another type of dynamic storage device that may store information and machine-readable instructions that may be executed by processor 502. For example, machine-readable storage medium 504 may be Synchronous DRAM (SDRAM), Double Data Rate (DDR), Rambus DRAM (RDRAM), Rambus RAM, etc. or storage memory media such as a floppy disk, a hard disk, a CD-ROM, a DVD, a pen drive, and the like. In an example, machine-readable storage medium may be a non-transitory machine-readable medium. Machine-readable storage medium 504 may store instructions 506, 508, 510, 512, and 514. In an example, instructions 506 may be executed by processor 502 to detect, by a master network switch in a stack, a new network switch in the stack. In response to the detection, instructions 508 may be executed by processor 502 to determine, by the master network switch, whether a member network switch of the stack is missing.

In response to a determination that the member network switch of the stack is missing, instructions 510 may be executed, by processor 502 to identify, by the master network switch, each active adjacent member of the member network switch. Instructions 512 may be executed by processor 502 to determine, by the master network switch, whether each active adjacent member of the member network switch has detected the new network switch in the stack. In response to a determination that each active adjacent member of the member network switch has detected the new network switch in the stack, Instructions 514 may be executed by processor 502 to provision, by the master network switch, the new network switch with a member ID of the member network switch to the stack.

For the purpose of simplicity of explanation, the example method of FIG. 3 is shown as executing serially, however it is to be understood and appreciated that the present and other examples are not limited by the illustrated order. The example systems of FIGS. 1, 2, 3, and 5, and method of FIG. 4 may be implemented in the form of a computer program product including computer-executable instructions, such as program code, which may be run on any suitable computing device in conjunction with a suitable operating system (for example, Microsoft Windows, Linux, UNIX, and the like). Examples within the scope of the present solution may also include program products comprising non-transitory computer-readable media for carrying or having computer-executable instructions or data structures stored thereon. Such computer-readable media can be any available media that can be accessed by a general purpose or special purpose computer. By way of example, such computer-readable media can comprise RAM, ROM, EPROM, EEPROM, CD-ROM, magnetic disk storage or other storage devices, or any other medium which can be used to carry or store desired program code in the form of computer-executable instructions and which can be accessed by a general purpose or special purpose computer. The computer readable instructions can also be accessed from memory and executed by a processor.

It should be noted that the above-described examples of the present solution is for the purpose of illustration only. Although the solution has been described in conjunction with a specific example thereof, numerous modifications may be possible without materially departing from the teachings and advantages of the subject matter described herein. Other substitutions, modifications and changes may be made without departing from the spirit of the present solution. All of the features disclosed in this specification (including any accompanying claims, abstract and drawings), and/or all of the steps of any method or process so disclosed, may be combined in any combination, except combinations where at least some of such features and, or steps are mutually exclusive.

The invention claimed is:

1. A method comprising:
    detecting, by a master network device in a stack, a new network device in the stack;
    in response to detecting, determining, by the master network device, whether a member network device of the stack is missing;
    in response to determining that the member network device of the stack is missing, identifying, by the master network device, each active adjacent member of the member network device;
    determining, by the master network device, whether each active adjacent member of the member network device has detected the new network device in the stack; and
    in response to determining that each active adjacent member of the member network device has detected the new network device in the stack, provisioning, by the master network device, the new network device with a member ID of the member network device to the stack.

2. The method of claim 1, further comprising:
    applying, by the master network device, a configuration setting of the member network device to the new network device.

3. The method of claim 1, wherein determining whether each active adjacent member of the member network device has detected the new network device in the stack comprises:
    determining that each active adjacent member of the member network device has detected the new network device on a respective port where the member network device was previously connected.

4. The method of claim 1, wherein identifying comprises:
    identifying, by the master network device, each active adjacent member of the member network device from a database present on the master network device.

5. The method of claim 1, wherein detecting comprises:
    receiving, by the master network device, information related to the new network device from the new network device;
    detecting, by the master network device, whether the information preexists on the master network device; and
    in response to a determination that the information does not preexist on the master network device, identifying, by the master network device, the new network device as a new addition to the stack.

6. The method of claim 1, wherein the information comprises one of a device type of the new network device and a MAC address of the new network device.

7. The method of claim 1, wherein member network devices of the stack, including the new network device, are arranged in a Ring topology.

8. A network device comprising:
    a detection engine to detect a new network device in a stack;
    a determination engine to, in response to detection, determine whether a member network device of the stack is missing;
    an identification engine to, in response to the determination that the member network device of the stack is missing, identify each active adjacent member of the member network device;
    the determination engine to determine whether each active adjacent member of the member network device has detected the new network device in the stack; and
    a provisioning engine to:
    in response to the determination that each active adjacent member of the member network device has detected the new network device in the stack, provision the new network device with a member ID of the member network device to the stack; and
    apply a configuration setting of the member network device to the new network device.

9. The network device of claim 8, wherein the network device manages a control plane of the stack.

10. The network device of claim 8, wherein the member ID includes a stack member number.

11. The network device of claim 8, wherein the provisioning engine is to unprovision the member network device from the stack.

12. The network device of claim 8, wherein the provisioning engine is to:
in response to a determination that the member network device of the stack is not missing, provision the new network device with a new member ID to the stack.

13. The network device of claim 8, wherein member network devices of the stack, including the new network device, are arranged in a chain topology.

14. A non-transitory machine-readable storage medium comprising instructions, the instructions executable by a processor to:
detect, by a master network switch in a stack, a new network switch in the stack;
in response to detection, determine, by the master network switch, whether a member network switch of the stack is missing;
in response to a determination that the member network switch of the stack is missing, identify, by the master network switch, each active adjacent member of the member network switch;
determine, by the master network switch, whether each active adjacent member of the member network switch has detected the new network switch in the stack; and
in response to a determination that each active adjacent member of the member network switch has detected the new network switch in the stack, provision, by the master network switch, the new network switch with a member ID of the member network switch to the stack.

15. The storage medium of claim 14, wherein the instructions to determine whether the member network switch of the stack is missing comprises instructions to:
send, by the master network switch, a heartbeat message to the member network switch; and
determine, by the master network switch, that no response is received to the heartbeat message from the member network switch.

16. The storage medium of claim 14, further comprising instructions to unprovision, by the member network switch, the member network switch from the stack.

17. The storage medium of claim 14, further comprising instructions to provision, by the master network switch, the new network switch with a new member ID to the stack, in response to a determination that the member network switch of the stack is not missing.

18. The storage medium of claim 14, wherein the instructions to determine whether each active adjacent member of the member network switch has detected the new network switch in the stack comprises instructions to:
receive, by the master network switch, information related to each active adjacent member of the new network switch from the new network switch; and
determine, based on the information, that each active adjacent member of the new network switch has detected the new network switch on a respective port where the member network switch was previously connected.

19. The storage medium of claim 18, wherein the information related to each active adjacent member of the new network switch comprises at least one of a device type of an active adjacent member of the new network switch, a MAC address of the active adjacent member, and a port identifier of a port on the active adjacent member where the new network switch is connected.

20. The storage medium of claim 14, wherein member network switches of the stack, including the new network switch, are arranged in a mesh topology.

* * * * *